2 Sheets—Sheet 1.

S. D. KING.
Car-Truck.

No. 227,792. Patented May 18, 1880.

Attest:
F. H. Schott
A. R. Brown

Inventor:
Sidney D. King
Jno. C. Tasker atty

2 Sheets—Sheet 2.

S. D. KING.
Car-Truck.

No. 227,792. Patented May 18, 1880.

Attest:
F. H. Schott.
A. R. Brown.

Inventor:
Sidney D. King
Geo. J. C. Tasker atty

UNITED STATES PATENT OFFICE.

SIDNEY D. KING, OF WEST PITTSTON, PENNSYLVANIA.

CAR-TRUCK.

SPECIFICATION forming part of Letters Patent No. 227,792, dated May 18, 1880.

Application filed February 24, 1880.

*To all whom it may concern:*

Be it known that I, SIDNEY D. KING, of West Pittston, in the county of Luzerne and State of Pennsylvania, have invented certain new and useful Improvements in Car-Trucks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improvement in that class of cars using trucks with but two wheels to each truck, instead of the four wheels which have commonly been employed, the object being to so construct the four-wheel car, or car provided with trucks having but a single pair of wheels at each end, as to avoid the rigidity that has heretofore been inseparable from such structures, causing great danger from the oscillation produced on uneven tracks, and giving to the car all the flexibility and steadiness of those provided with four-wheel trucks at each end, and with greatly-lessened danger of jumping the track in rounding curves.

Figure 1:
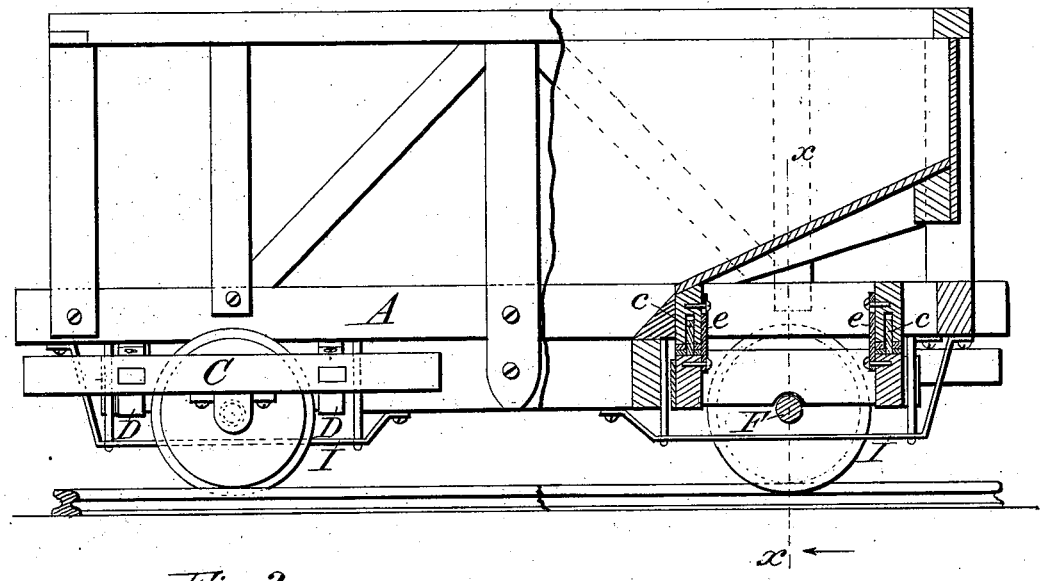
Figure 2:
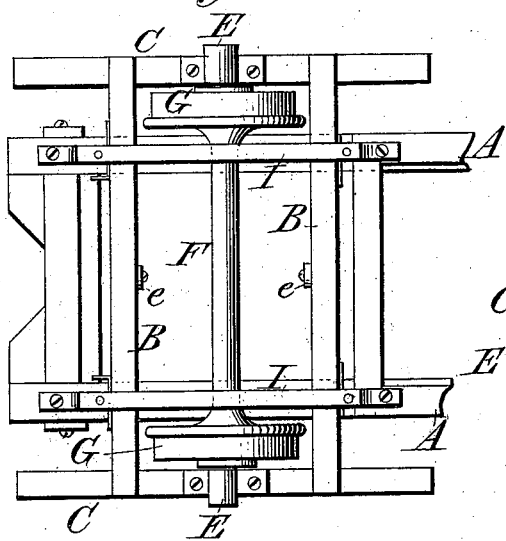
Figure 3:
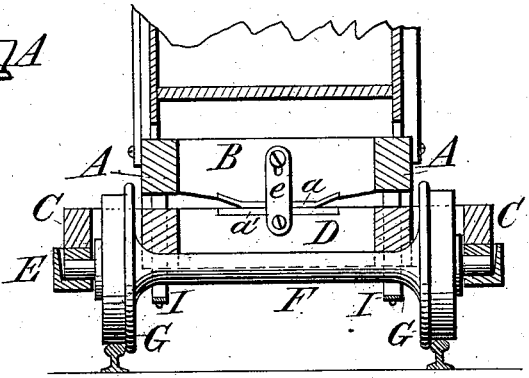
Figure 4:
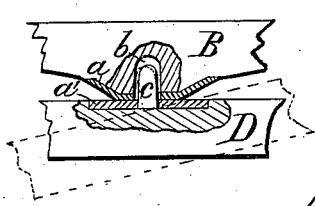
Figure 6:
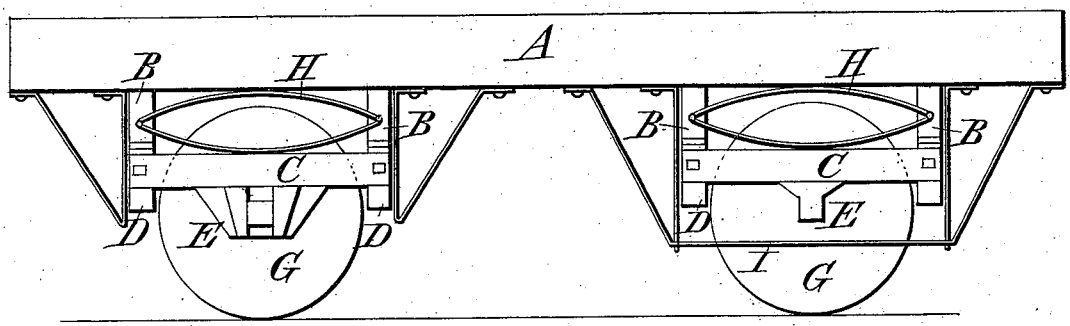
Figure 5:
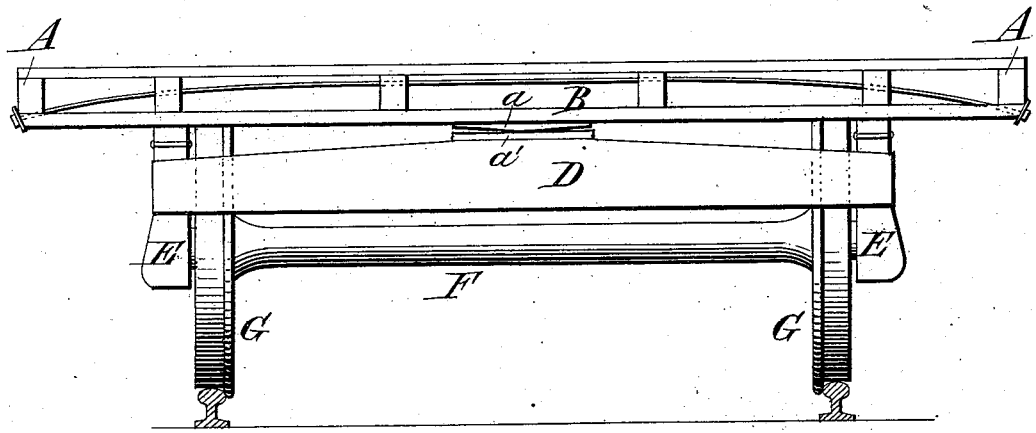

In the drawings, Figure 1 is a side view of a narrow car, partly in section, showing the method of arranging the trucks beneath the car. Fig. 2 is a bottom plan of one of the trucks, also showing a portion of the car-frame. Fig. 3 is a transverse section of the car and truck on the line $x\ x$ of Fig. 1. Fig. 4 is an enlarged detail of one of the points of support, illustrating by dotted lines the position a truck may assume without disturbing the equilibrium of the car. Fig. 5 is a vertical transverse section of a broad car supported by my improved truck. Fig. 6 is a side view of the same, showing the position and arrangement of the springs by which the car is partially sustained upon the truck.

A represents the outer side pieces of a car-frame connected by suitable girts and the bolsters B, each of these bolsters being provided upon its under side with a rocking plate, $a$, through which, and extending into the bolster, is formed the mortise $b$, for the reception of pins $c$, that project upward from the plates $a'$ upon the truck-beams D. These truck-beams are connected at their outer ends by the longitudinal pieces C, to which are secured the axle-boxes E, in which revolve the journals of the axles F, carrying the car-wheels G.

It will be observed that each truck is provided with but a single axle. It therefore becomes necessary to provide means for retaining it in its proper position beneath the car, and at the same time preserve the flexibility of the connection, so that the wheels may accommodate themselves to any unevenness of the track without imparting such movement to the car-body. This is effectually accomplished by supporting the bolsters of the car-body principally upon a central line, or, in other words, at the points where the pins $c$ enter the bolsters, the mortises through the rocking plate $a$ and in the bolster being of sufficient length to allow a free rocking movement of the bolster upon the pin and bearing-plate $a'$, as is clearly illustrated in Fig. 4 of the drawings, while the bearing of the car-frame upon the truck-beams at two points upon opposite sides of the car-axle preserves the horizontality of the truck in a longitudinal direction.

To further increase the security of the connection between the parts, the straps $e$ may be attached at one end to the truck-beams by a pivotal connection, their opposite ends being slotted and secured to the bolsters by a bolt passing through the slots, so as to give free movement to the parts within certain limits.

Still further security may be gained, if desired, by applying the strap-braces I to the body-frame and allowing them to pass below the axle without touching, while their ends are firmly attached to the frame.

When this improved construction is applied to narrow cars the flattening of the rocking plate for a short distance each way from the mortise $b$ will give the car all the stability needed; but when wide cars are used it may be found best to add the springs H, which can be placed upon the side pieces, C, of the truck-frame and arranged to partially support the car-body, thus preventing any undue oscillation of the latter.

Experience has demonstrated that a car can be built to carry a given load with my two-wheel trucks with twenty-five to thirty-three per cent. less weight of car than with the four-wheel truck, thus making a very great saving in the hauling of dead weight in trains, and also making a great saving in the cost of the trucks, and also allowing the wheels to be placed about twice the distance apart with safety that can be done in the ordinary manner of building four-wheeled cars, and at the same time giving to the car all the flexibility of a car with four-wheeled trucks and saving the wear on the wheels and track caused by the oscillating motion of the four-wheeled trucks.

Having thus described my invention, I claim—

The combination of a two-wheeled non-swiveling car-truck provided with two central points of support upon opposite sides of its axle with a car-body, and means, substantially as described, for preventing undue oscillation of the body upon the truck, as set forth.

In testimony that I claim the foregoing I have hereunto set my hand this 16th day of February, 1880.

SIDNEY D. KING.

Witnesses:
J. R. WRIGHT,
C. R. PATTERSON.